July 15, 1947.  D. M. CONNOR  2,424,078
ARTIFICIAL KNEE AND BRAKE
Filed May 12, 1945   3 Sheets-Sheet 1
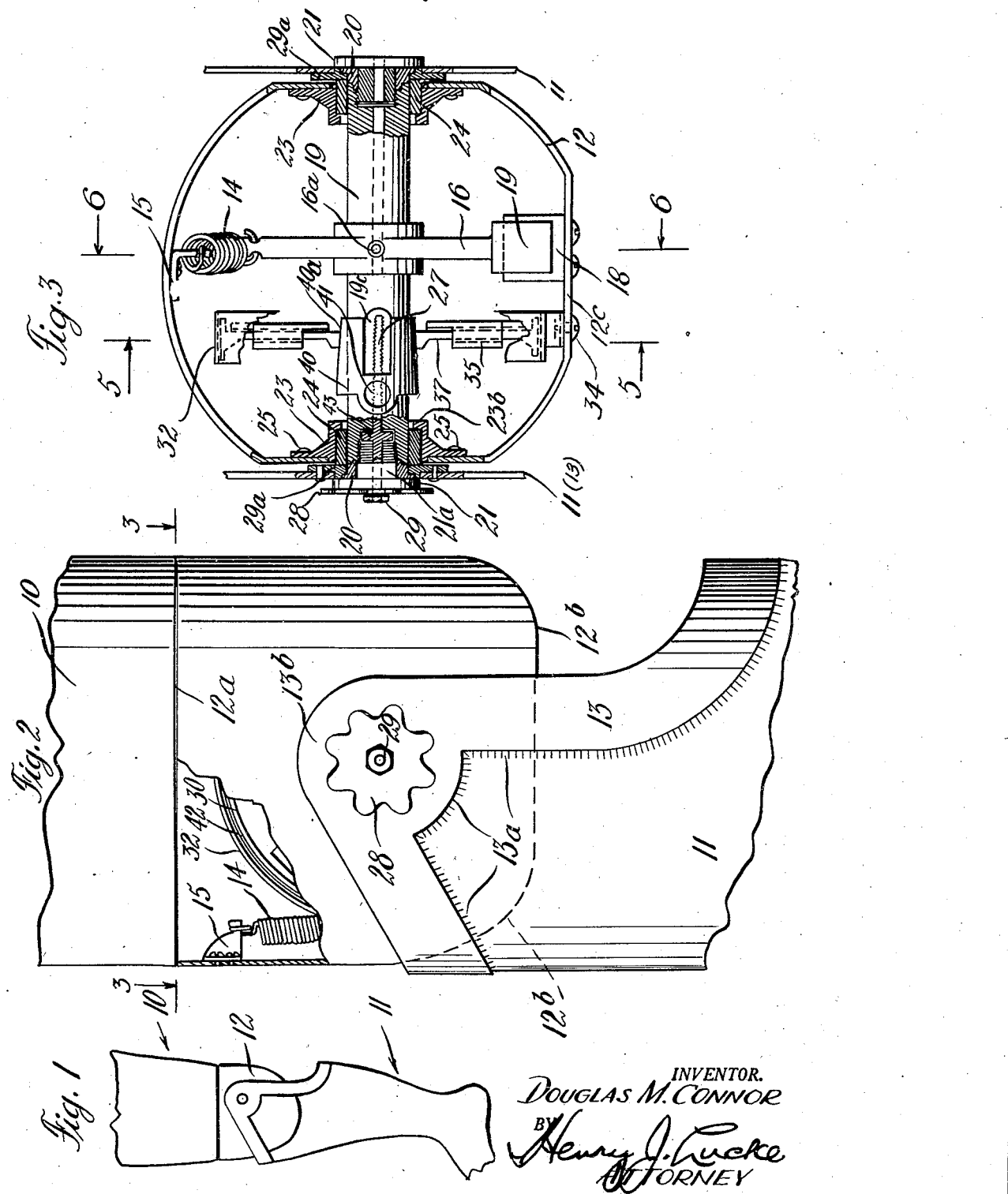

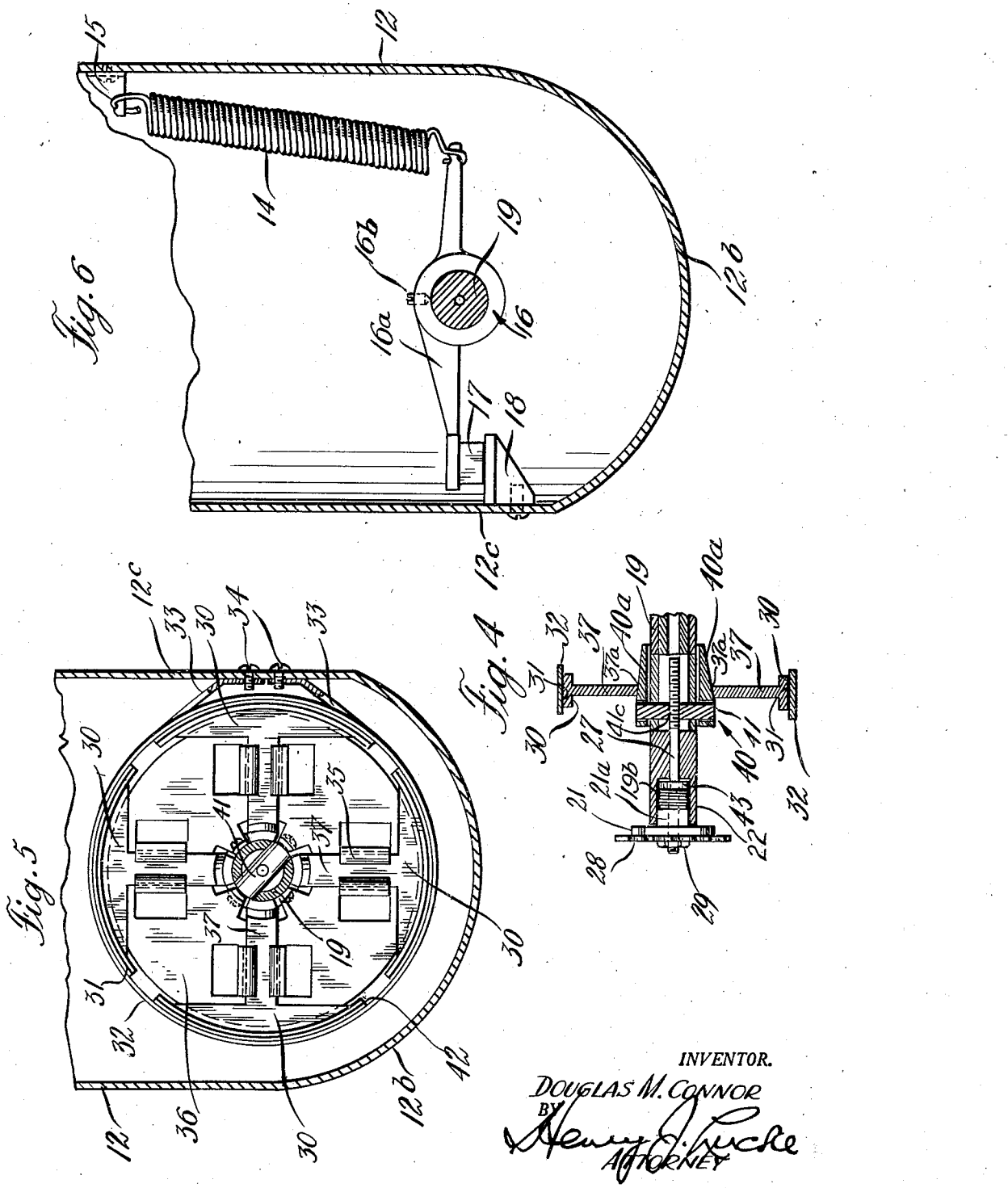

July 15, 1947. D. M. CONNOR 2,424,078
ARTIFICIAL KNEE AND BRAKE
Filed May 12, 1945 3 Sheets-Sheet 3
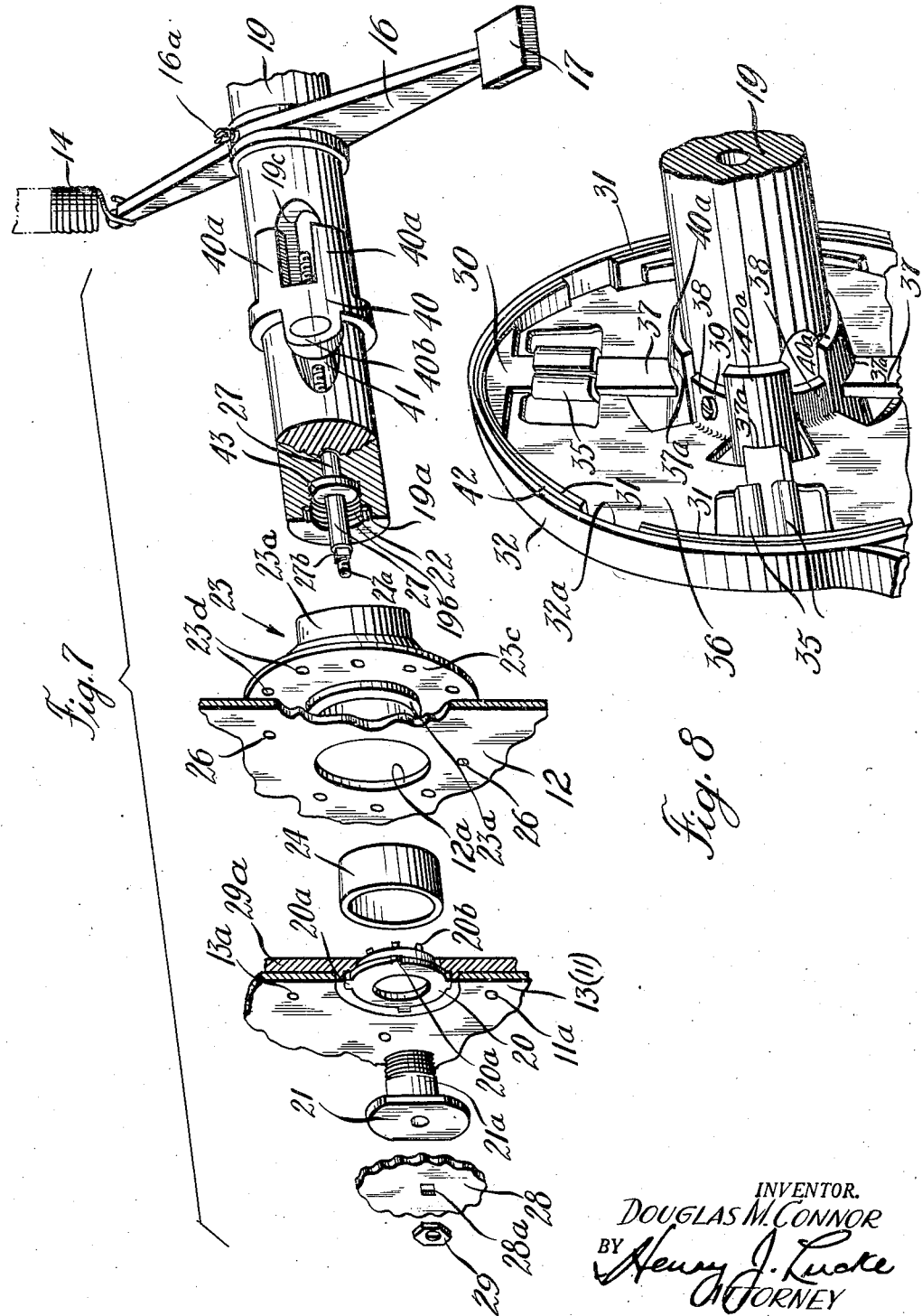
INVENTOR.
DOUGLAS M. CONNOR
BY Henry J. Lucke
ATTORNEY Patented July 15, 1947

2,424,078

UNITED STATES PATENT OFFICE 2,424,078

ARTIFICIAL KNEE AND BRAKE

Douglas M. Connor, Watchung, N. J.

Application May 12, 1945, Serial No. 593,371

5 Claims. (Cl. 3—2)

My invention relates to an artificial knee and therewith combined brake.

The invention is directed to an artificial knee and brake arranged and co-ordinated with a thigh member and a shin member to afford a complete artificial leg for the stable support of a human person without requiring a crutch, and to impart movements to the shin member relative to the thigh member in substantial similitude of natural members of a human leg.

More particularly, embodiments of the invention comprise a knee member and a brake mechanism therefor, which is arranged to be exteriorly adjustable to thereby regulate the degree of flexibility of the knee member to conform to variant conditions of use or occupation. Thus, for use in ice or roller skating and for continuous standing on unsteady footing, the adjustable means is set to fixed position to afford straight alignment between the thigh member and the shin member; for horseback riding the shin member is set at a desired angle with relation to the thigh member. In general, the required degree of flexibility of the kne member will vary with the wearer, depending upon various factors such as style of walking, muscular development, dimensional relationship of shin member and thigh member, etc. Such adjustable means, in preferred embodiments of the invention is organized to afford compensation for wear of the effective faces of the brake shoe members and/or friction part of the brake band means. Such adjustable means is arranged to be adjusted by the wearer by simple movement of a readily accessible, manually settable member.

More particularly, preferred embodiments of the invention comprise a cup member which may be of metal or other suitable material, which may be welded or otherwise firmly secured to the thigh member, which may be of metal or other material; such cup member is articulatively associated with the shin member by suitable interconnecting means. Within such cup member are arranged suitable mechanisms including a brake mechanism and its exteriorly accessible adjusting means whereby under normal walking conditions substantially uniform flexibility is provided for the full gamut of to-and-fro movements of the shin member with respect to the thigh member. Suitable stop means is also provided, and preferably within such cup member, for resiliently limiting the forward return movement of the shin member in its articulative motion with respect to the thigh member, thus imparting pseudo-natural movements of these members with relation to one another. Desirably, friction strips are interposed between the effective faces of the brake shoes and the brake band, and most preferably such friction strips are of self-lubricating metal or equivalent material secured or affixed to, or forming a part of, the effective faces of the brake shoes.

Most preferred embodiments of the invention comprise a cup member functioning as a knee and the essential parts provided for by the invention are carried by such knee-substituting member, partly within and partly exteriorly thereof, thus constituting a mechanical unit and enabling the invention to be applied to conventional thigh and shin members by simple welding or like procedure.

Pursuant to conventional practice, the exterior faces of the thigh member, its cup member and the shin member and other exposed metal parts are colored to simulate the natural color of human flesh.

As will appear hereinafter, the invention affords a relatively inexpensive artificial substitute for the knee and lower leg for a human person and provides an assembly of such substituted parts which effectively conceals its mechanical constitution, readily adjustable at all times, furnishes stable support for the wearer and is dependable for long life.

Further features and objects of the invention will be more fully understood from the following detailed description and the accompanying drawings in which—

Fig. 1 is a diagrammatic elevational view illustrating generally the application of the invention.

Fig. 2 is an enlarged elevational view partially showing the thigh member and the shin member inclusive of its cup member; mechanisms forming essential parts of the subject matter of the invention are enclosed, or otherwise associated, with such cup member. A portion of the cup member, in this view, is broken away to expose otherwise hidden parts.

Fig. 3 is a horizontal sectional view taken on line 3—3 of Fig. 2, assuming a rotation of ninety angular degrees. This view is in substance a top plan view of the cup member and therein contained parts illustrating a preferred embodiment of the invention.

Fig. 4 is a detail diagrammatic sectional view illustrating generally the adjusting screw, its manual adjusting member and the brake shoe assembly.

Fig. 5 is a detail sectional view on line 5—5 of Fig. 3.

Fig. 6 is a detail sectional view on line 6—6 of Fig. 3.

Fig. 7 is an exploded view illustrating in seriatim the respective component parts interconnecting the cup member of the thigh member and the shin member and the mechanisms providing for the articulation and the braking of the motion of the shin member relative to the thigh member and for resiliently restricting the return movement of the shin member.

Fig. 8 is a detail fragmentary perspective of the brake assembly.

Referring to the drawings illustrating a preferred embodiment of the invention, 10 indicates generally the thigh member and 11 the shin member. These members may be of conventional construction and specifically do not form particular features of the invention. The association of the stated thigh and shin members is best effected by forming these members of metal, which is suitably colored in simulation of the color of human flesh.

The cup member 12, see Figs. 2, 3, 5 and 6, is preferably formed of metal, its upper edge 12a being welded or otherwise firmly secured to a thigh member 10. As indicated in the drawings, the lower peripheral edge 12b has an arcuate contour in similitude to the frontal contour of the human knee. The cup member 12 is articulatively associated with the shin member 11 by means of oppositely arranged bracket arms 13, 13, the lower edges 13a of which are welded or otherwise secured to the contiguous edges of the shin member 11. The respective opposite bend portions 13b of these brackets 13, 13, are provided with openings, hereinafter referred to more fully, with particular reference to Figs. 3 and 7, for the reception of the supporting mechanism of the shin member.

The assembly provides for a restricted articulative movement of the shin member relative to the thigh member, such arrangement including means for automatically effecting the return movement of the shin member comprising the retractile spring 14 having its one end attached to the bracket 15 which is fixed relative to the thigh member, i. e. to the inner face of the front wall of the cup member. The free end of the spring 14, see Figs. 3, 6 and 7, is connected to one end of the lever arm 16; the other end 16a of the lever arm carries a stop element 17, preferably of resilient character such as rubber, which abuts the limit stop lug 18 which is fixedly secured to the inner face of the rearward wall 12c of the cup member 12. The lever 16 is fixedly fulcrumed, see Fig. 7, to the shaft 19 of the main mechanism which extends centrally and horizontally with respect to the cup member. The shaft 19, as indicated in Figs. 3, 5 and 8, is secured at its opposite ends to the brackets 13, 13, and thus to the shin member 11, and rotatively mounted within and with respect to the cup member, whereby the shaft 19 is oscillated about a horizontal axis coincidental with the articulation of the shin member with respect to the thigh member. At this point it is added generally, and explained more fully hereinafter, that the braking and regulation of the to-and-fro articulative movements of the shin member with respect to the thigh member are associated within the main shaft 19.

Referring to the assembly view, Fig. 3, and to the exploded view, Fig. 7, a preferred arrangement of fixedly securing the shaft 19 to the shin member and rotatively with respect to the thigh member, comprises the lock washer 20, having radially extending locking projections 20a which engage into locking recesses 11a of the shin member 11. The lock washer has also inwardly extending projections 20b which engage into the locking recesses 19a countersunk laterally about the periphery of the opening at the end of the shaft 19. The lock washer is fixedly secured at the end of the shaft by the locking plug 21, the threaded end of which mates with the threading 22 within the inner face of the opening of the shaft end, and to guard against unwanted displacement of the plug, the unthreaded face 21a is given a slight angular taper, say 3 degrees, and the inner face of the lock washer 20 also a slight taper, say 3 degrees, in opposing direction. The exterior end of the plug 21 is "squared" or provided with a polygonal configuration for use with a wrench or similar tool for forcibly inserting and facilitating the withdrawal of the plug.

Between the shin member 11 and one end of the shaft are the bearing box 23 and the bearing bushing 24, the annular end 23a of the bearing box receiving the bearing bushing 24, which latter bearingly embraces the shaft end. At the terminal edge of the annular end 23a is an inwardly extending annular flange 23b, see Fig. 3, which retains the bushing 24 in position. The radially extending flange 23c of the bearing box, see Fig. 7, is secured to the cup member 12 by rivets 25, see Fig. 3, which are located in the respective registering openings 26 of the cup member, see Fig. 7, and the indicated openings 23d of the bearing box. The bearing box 23 is shown provided also with an outward, axially extending annular retaining flange 23e dimensioned to make a tight fit within the opening 10a of the cup member 12, cooperating with the stated riveted face-to-face connection between the bearing box 23 and the cup member 12 against torsional thrusts incident to the rotation of the shaft 19 with respect to the thigh member 10 and its cup 12.

It will be observed that the locking plug 21 is provided with a central hole through which passes the end of the screw 27, which as presently explained serves to adjust the braking means for frictionally controlling the to-and-fro articulative motions of the shin member. The outer end of the reduced portion of the adjusting screw 27 is threaded as indicated at 27a and inwardly of such threading the reduced end of the screw 27 is "squared," see 27b, to mate with the "squared" opening 28a of the adjusting member 28. The nut 29 mating with the threading 27a, serves to tighten and lock the end of the adjusting screw 27 with respect to the adjusting member 28.

Fig. 7 shows in enlarged perspective, as appears in assembled illustration in Fig. 3 on reduced scale, the end thrust bearing plate 29a which is fixedly secured by rivets to the inner face of the bracket 13; the rivet openings in the bracket are indicated at 13a in Fig. 7.

Suitable means are provided for frictionally regulating the return movement of the shin member with respect to the thigh member, and pursuant to the preferred forms of the invention, such regulation is exteriorly adjustable to afford proper to-and-fro articulation as well as compensate for wear of the concerned parts. As shown in the drawings, frictional regulation is attained by means of brake shoes 30, shown four in number, and substantially equally spaced from one another, and extending radially with respect to the shaft 19. The contour of the face 31 of each brake shoe is that of an elongated arc; each face cooperates with the inner face 32a of the brake band 32.

The brake band 32, as appears from Fig. 5, and also Fig. 3, is a complete circular band secured in position by its longitudinal lugs 33, 33, see Fig. 5, to the cup member 12, as by the screws 34, 34. The brake shoes 30, etc. are slidingly and guidingly held in position within the ears 35, 35, by the positioning plate 36, see Fig. 8, which has a circular outer periphery spaced from the brake band 32. The respective sets of ears 35, 35, are shown formed by blank cutting the material of the plate 36 to form fingers and bending the same over to proper clearance to form guideways for the arms 37 of the brake shoes. Centrally, the positioning plate 36 is blanked and turned inwardly, see Fig. 8, to provide mutually spaced arcuately shaped flanges 38 which extend substantially parallel to the peripheral edge of the circular opening. The edge of the circular opening and its flanges 38 make a close fit about the exterior face of the shaft 19. The flanges 38 are secured to the shaft 19, as by screws, one of which is indicated at 39, or by welding or the like.

As indicated hereinabove, the effective friction between the faces of the brake shoe and the brake band is controlled by a regulating screw which is designated 27 in Figs. 4 and 7, the adjustment of the screw being had through the adjusting member 28. As one form for attaining adjustment by regulation of the adjusting screw 27, there is provided the adjusting sleeve 40, the inner diameter of which makes a slip fit with the outer diameter of the shaft 19; the adjusting sleeve 40 is provided with a plurality, in this instance four, axially projecting tapering arcuate portions 40a, the upper faces of which respectively engage the arcuately contoured faces 37a of the arms of the brake shoes. The adjusting sleeve 40 is operatively associated with the adjusting screw 27 by means of the pin 41, see also Fig. 5, which passes through the opposite eared lugs 40b of the sleeve, thence through the respective opposite slots 19c formed in the main shaft 19, the pin 41 being provided centrally with a transverse opening 40c which is threaded to mate with the threading of the adjusting screw 27. Accordingly, upon rotative movement of the manual member 28 and consequent rotation of the adjusting screw 27, the pin 41 and therewith the adjusting tapering parts 40a are shifted axially correspondingly, thereby applying correspondingly increased or decreased pressure in the respective radial directions against the arms of the brake shoes 40 and thereby regulating the effective friction between the effective faces 31 of the brake shoes and the brake band 32.

Preferably, a self-lubricating friction strip 42, see Figs. 4 and 8, is applied as an insert at the effective face of each brake shoe, thereby providing lubrication between the concerned friction-engaging faces.

It is therefore apparent that the adjustment of the adjusting screw attains regulation of the degree of flexibility desired by the user with respect to the relative motions of the shin member and the thigh member and also serves to compensate for wear of the friction strips.

The slot 19c, see Fig. 7, of the main shaft 19 is dimensioned to limit the extreme movements of the pin 41 with respect to the shaft 19. To afford suitable end thrust bearing for the regulating screw 27, the regulating screw is formed with, or otherwise provided with, a shoulder 43 which is received within the countersunk opening 19b of the shaft 19, the flat circular end face of the stop plug 21 serving as a bearing, engaging the juxtaposed face of the shoulder 43.

It will be also observed that the respective endwise thrusts transmitted through the arms of the brake shoes to the tapered sleeve 40 and thus to the main shaft 19 oppose one another and thus neutralize one another, thereby freeing the main shaft of force tending to displace the shaft relative to its bearings.

The lever arm 16 is shown fixedly secured to shaft 19, as by means of the indicated set screw 16b, see Fig. 5, and accordingly the arm 16 is rotated simultaneously with the shaft 19, thus tensioning the spring 14 when the thigh member is moved upwardly at the initial stage of taking a fresh step. The brake band 32, as has been noted, is a complete circular strip, see Figs. 3 and 5, to afford face-to-face engagement with a flattened inner face of the wall 12c of the cup part of the thigh member, the engagement being secured by the screws 34 thus maintaining the brake band 32 in proper relation with the brake shoes.

It will be observed that the assembly including the adjusting member 28 is located at one side and exteriorly of the cup member and in axial alignment with one end of the main shaft, namely at the left in the assembled view of Fig. 3, and likewise in the exploded view of Fig. 7. Certain of the parts of the assembly are duplicated at the opposite end of the main shaft, namely the lock washer 29, the locking plug 21, the bearing box 23, the bearing bushing 24, and the fixed connections between the locking plug and the shin member and between the bearing box and the cup member, i. e., the thigh member.

As indicated hereinabove, the essential mechanisms provided for by the invention are associated with the cup member as a unit. In the use of embodiments of the invention for a left artificial leg as compared with a right artificial leg, the adjusting member 28 is positioned to extend in the opposite direction, to wit, by merely rotating as a unit the main shaft and its associated mechanisms 180 angular degrees in a horizontal plane, and reversing the positions of the respective ends of the brake lever, including shifting the connection of one end of the retractile spring with the cup member and the location of the stop bracket.

From the above it will be observed that the braking assembly is effective for the full gamut of reciprocal motions of the shin member relative to the thigh member, the retractile spring serving to impart to the shin member in the course of foot travel resiliency of movement in its transit from the ground upwardly, the combinational arrangement of the invention, accordingly, affording artificial members organized to closely simulate the normal flexing motions of a human leg, as well as providing stable support to the user without requiring a crutch or a cane.

It is apparent that the combinational relationship of the component parts of the several assemblies results in a construction which is sturdy and reliable, and being housed within the cup member, are protected against accidental damage, thus ensuring long life.

Whereas, I have illustrated my invention by reference to a typical preferred embodiment of the invention, it will be understood that the invention is not restricted thereto and that changes or modifications may be made without departing from the invention as defined by the appended claims.

I claim:

1. An artificial knee and brake assembly in combination with a thigh member and a shin member, said artificial knee and brake assembly comprising a cup member the open end of which is arranged to be secured to the open end of the thigh member, said knee and brake assembly further comprising a shaft rotatably mounted in said cup member, means arranged to connect the opposite ends of said shaft to the shin member, brake means mounted within said cup member including a brake band the ends of which are fixedly secured to said cup member, radially reciprocable brake shoe means cooperating with said brake band, and means carried by said shaft and movable axially relative thereto for adjusting the radial position of said radially reciprocable brake shoe means with respect to said brake band.

2. An artificial knee and brake assembly in combination with a thigh member and a shin member, said artificial knee and brake assembly comprising a cup member the open end of which is arranged to be secured to the open end of the thigh member, said knee and brake assembly further comprising a shaft rotatably mounted in said cup member, means arranged to connect the opposite ends of said shaft to the shin member, brake means mounted within said cup member including a brake band the ends of which are fixedly secured to said cup member, radially reciprocable brake shoe means cooperating with said brake band, means carried by said shaft and movable axially relative thereto for adjusting the radial position of said radially reciprocable brake shoe means with respect to said brake band, and means for limiting the extent of oscillation of said shaft.

3. An artificial knee and brake assembly in combination with a thigh member and a shin member, said artificial knee and brake assembly comprising a cup member the open end of which is arranged to be secured to the open end of the thigh member, said knee and brake assembly further comprising a shaft rotatably mounted in said cup member, means arranged to connect the opposite ends of said shaft to the shin member, brake means mounted within said cup member including a brake band the ends of which are fixedly secured to said cup member, radially reciprocable brake shoe means cooperating with said brake band, means carried by said shaft and movable axially relative thereto for adjusting the radial position of said radially reciprocable brake shoe means with respect to said brake band, and resilient means for limiting the extent of oscillation of said shaft.

4. An artificial knee and brake assembly in combination with a thigh member and a shin member, said artificial knee and brake assembly comprising a cup member the open end of which is arranged to be secured to the open end of the thigh member, said knee and brake assembly further comprising a shaft rotatably mounted in said cup member, means arranged to connect the opposite ends of said shaft to the shin member, brake means mounted within said cup member including a brake band the ends of which are fixedly secured to said cup member, radially reciprocable brake shoe means cooperating with said brake band, and means carried by said shaft and movable axially relative thereto for adjusting the radial position of said radially reciprocable brake shoe means with respect to said brake band, said adjusting means including an element having a threaded portion, said shaft being provided at one end with an axially extending opening having threading mating with said threaded portion of said element, said adjusting means further including a manipulating member controlling said threading-provided element.

5. An artificial knee and brake assembly in combination with a thigh member and a shin member, said artificial knee and brake assembly comprising a cup member the open end of which is arranged to be secured to the open end of the thigh member, said knee and brake assembly further comprising a shaft rotatably mounted in said cup member, means arranged to connect the opposite ends of said shaft to the shin member, brake means mounted within said cup member including a brake band the ends of which are fixedly secured to said cup member, radially reciprocable brake shoe means cooperating with said brake band, and means carried by said shaft and movable axially relative thereto for adjusting the radial position of said radially reciprocable brake shoe means with respect to said brake band, said adjusting means including an element having a threaded portion, said shaft being provided at one end with an axially extending opening having threading mating with said threaded portion of said element, said adjusting means further including a manipulating member controlling said threading-provided element, said manipulating member being disposed exteriorly of said cup member.

DOUGLAS M. CONNOR.

REFERENCES CITED

The following references are of record in the file of this patent:

UNITED STATES PATENTS

| Number | Name | Date |
|---|---|---|
| 2,175,136 | Stewart | Oct. 3, 1939 |
| 2,024,673 | Webb | Dec. 17, 1935 |
| 1,991,796 | Desoutter | Feb. 19, 1935 |
| 2,336,881 | Mortensen | Dec. 14, 1943 |

FOREIGN PATENTS

| Number | Country | Date |
|---|---|---|
| 416,341 | Great Britain | Sept. 11, 1934 |
| 495,281 | Great Britain | Nov. 10, 1938 |
| 281,805 | Great Britain | Dec. 15, 1927 |